US009652902B2

(12) United States Patent
Fazeli et al.

(10) Patent No.: US 9,652,902 B2
(45) Date of Patent: May 16, 2017

(54) PITCH TRIM ACTUATOR SERVICING MONITORING SYSTEM (71) Applicant: GOODRICH CORPORATION, Charlotte, NC (US)

(72) Inventors: Amir M. Fazeli, Milton (CA); Adnan Cepic, Mississauga (CA); Susanne M. Reber, Middleburg Heights, OH (US)

(73) Assignee: Goodrich Corporation, Charlotte, NC (US)

( * ) Notice: Subject to any disclaimer, the term of this patent is extended or adjusted under 35 U.S.C. 154(b) by 254 days.

(21) Appl. No.: 14/522,105

(22) Filed: Oct. 23, 2014

(65) Prior Publication Data
US 2016/0027225 A1 Jan. 28, 2016

Related U.S. Application Data (60) Provisional application No. 62/028,351, filed on Jul. 24, 2014.

(51) Int. Cl.
*G07C 5/08* (2006.01)
*B64D 45/00* (2006.01)
(Continued)

(52) U.S. Cl.
CPC ............ *G07C 5/0808* (2013.01); *B64C 25/60* (2013.01); *B64D 45/00* (2013.01);
(Continued)

(58) Field of Classification Search
None
See application file for complete search history.

(56) References Cited

U.S. PATENT DOCUMENTS

| 5,458,219 A * | 10/1995 | Anderson ............ F16F 9/43 188/315 |
| 2006/0144997 A1* | 7/2006 | Schmidt ............ B64F 5/0045 244/100 R |

(Continued)

FOREIGN PATENT DOCUMENTS

| DE | 3224136 | 12/1983 |
| GB | 2453554 | 4/2009 |

OTHER PUBLICATIONS

Dr. Luis, Why Take Averages in Experiments?, May 5, 2003, The Math Forum.*

(Continued)

*Primary Examiner* — Fadey Jabr
*Assistant Examiner* — Kevin P Mahne
(74) *Attorney, Agent, or Firm* — Snell Wilmer L.L.P.

(57) ABSTRACT

A method includes detecting at least one position measurement of a separator piston of a pitch trim actuator. The method includes detecting at least one pressure measurement of a gas. The method includes detecting at least one temperature measurement of the gas. The method includes storing at least one position value based on the at least one position measurement of the separator piston, at least one pressure value based on the at least one pressure measurement of the gas and at least one temperature value based on the at least one temperature measurement of the gas. The method includes determining a volume of an oil within an oil chamber of the pitch trim actuator and a pressure of the gas within the gas chamber of the pitch trim actuator, based on the at least one position value, the at least one pressure value and the at least one temperature value.

19 Claims, 7 Drawing Sheets

(51) Int. Cl.
*B64C 25/60* (2006.01)
*F15B 1/24* (2006.01)
*F15B 19/00* (2006.01)
*F15B 20/00* (2006.01)

(52) U.S. Cl.
CPC ........ *B64D 2045/0085* (2013.01); *F15B 1/24* (2013.01); *F15B 19/005* (2013.01); *F15B 20/005* (2013.01); *F15B 2201/50* (2013.01); *F15B 2201/51* (2013.01); *F15B 2201/515* (2013.01); *F15B 2211/625* (2013.01); *F15B 2211/7054* (2013.01); *F15B 2211/857* (2013.01)

(56) References Cited

U.S. PATENT DOCUMENTS

| | | | |
|---|---|---|---|
| 2007/0069072 A1 | 3/2007 | Luce | |
| 2009/0290971 A1* | 11/2009 | Shamseldin | F04D 29/124 415/1 |
| 2012/0053783 A1 | 3/2012 | Nance | |
| 2014/0046533 A1* | 2/2014 | Nance | B64F 5/0045 701/33.7 |
| 2014/0210253 A1* | 7/2014 | Okano | B60T 13/146 303/6.01 |
| 2016/0076561 A1* | 3/2016 | Green | B64C 25/60 92/143 |

OTHER PUBLICATIONS

Extended European Search Report dated Jan. 5, 2016 in European Application No. 15177984.0.

* cited by examiner

PITCH TRIM ACTUATOR SERVICING MONITORING SYSTEM

CROSS REFERENCE TO RELATED APPLICATIONS

This application claims priority to and is a non-provisional application of U.S. Provisional Patent Application Ser. No. 62/028,351 filed on Jul. 24, 2014 and entitled "Pitch Trim Actuator Servicing Monitoring System," the contents of which are hereby incorporated by reference in their entirety.

FIELD

The present disclosure relates to landing gear, and more particularly, to systems and methods for monitoring the service requirements of a pitch trim actuator.

BACKGROUND

Landing gear supports an aircraft while the aircraft is on the ground. Some landing gear may include a bogie beam which supports one or more pairs of wheels. The bogie beam may pivot relative to the landing gear. A pitch trim actuator may orient the bogie beam to a flight position during landing gear retraction and extension.

SUMMARY

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

A method for determining a status of fluids within a pitch trim actuator of an aircraft is described. The method includes detecting, by a position sensor, at least one position measurement of a separator piston of the pitch trim actuator. The method also includes detecting, by a pressure sensor, at least one pressure measurement of a gas within a gas chamber of the pitch trim actuator. The method also includes detecting, by a temperature sensor, at least one temperature measurement of the gas within the gas chamber of the pitch trim actuator. The method also includes storing, in a memory, at least one position value based on the at least one position measurement of the separator piston, at least one pressure value based on the at least one pressure measurement of the gas and at least one temperature value based on the at least one temperature measurement of the gas. The method also includes determining, by a processor, a volume of an oil within an oil chamber of the pitch trim actuator and a pressure of the gas within the gas chamber of the pitch trim actuator, based on the at least one position value, the at least one pressure value and the at least one temperature value. In various embodiments, the method includes determining, by the processor, an adjusted volume of gas and an adjusted volume of oil in the pitch trim actuator adjusted to a lowest operating temperature based on the volume of gas and the volume of oil. In various embodiments, the method includes comparing, by the processor, the adjusted volume of gas and the adjusted volume of oil in the pitch trim actuator adjusted to the lowest operating temperature to a set of predetermined thresholds.

Also described is a method for determining a status of fluids within a pitch trim actuator of an aircraft. The method includes detecting, by a position sensor, at least one position measurement of a separator piston of the pitch trim actuator. The method also includes detecting, by a pressure sensor, at least one pressure measurement of an oil within an oil chamber of the pitch trim actuator. The method also includes detecting, by a temperature sensor, at least one temperature measurement of the oil within the oil chamber of the pitch trim actuator. The method also includes storing, in a memory, at least one position value based on the at least one position measurement of the separator piston, at least one pressure value based on the at least one pressure measurement of the oil and at least one temperature value based on the at least one temperature measurement of the oil. The method also includes determining, by a processor, whether the pitch trim actuator requires servicing based on the at least one position value, the at least one pressure value and the at least one temperature value.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosure, it should be understood that other embodiments may be realized and that logical, chemical and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
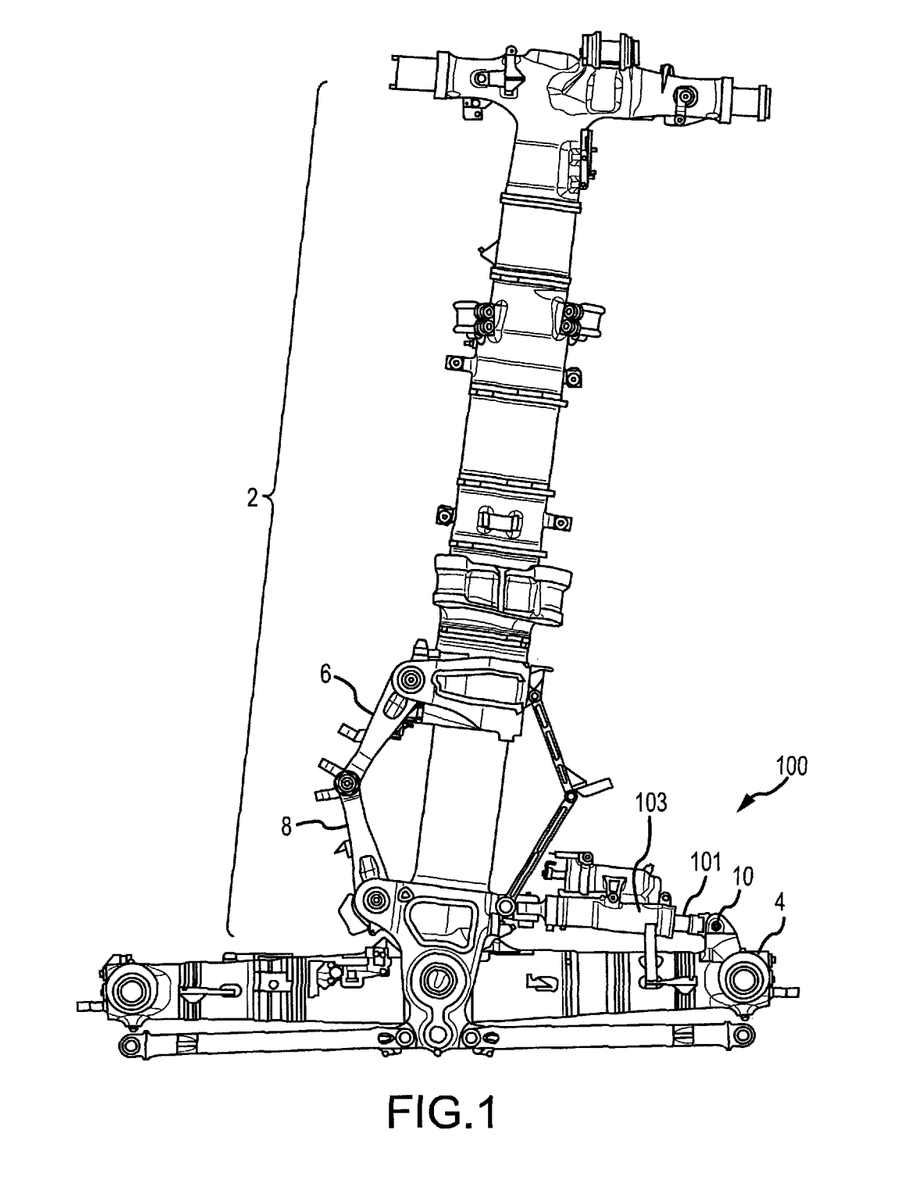
FIG. 1 illustrates a portion of a bogie-type landing gear in a deployed position, in accordance with various embodiments.

Referring to FIG. 1, a portion of a landing gear is illustrated in a deployed position, according to various embodiments.

Landing gear may comprise strut 2 and bogie beam 4. Bogie beam 4 may support one or more axles. The one or more axles may have one or more wheels mounted for rotation. In that regard, when on the ground, the weight of the aircraft is transferred through the landing gear to the one or more axles and finally to the one or more wheels.

Figure 2A:
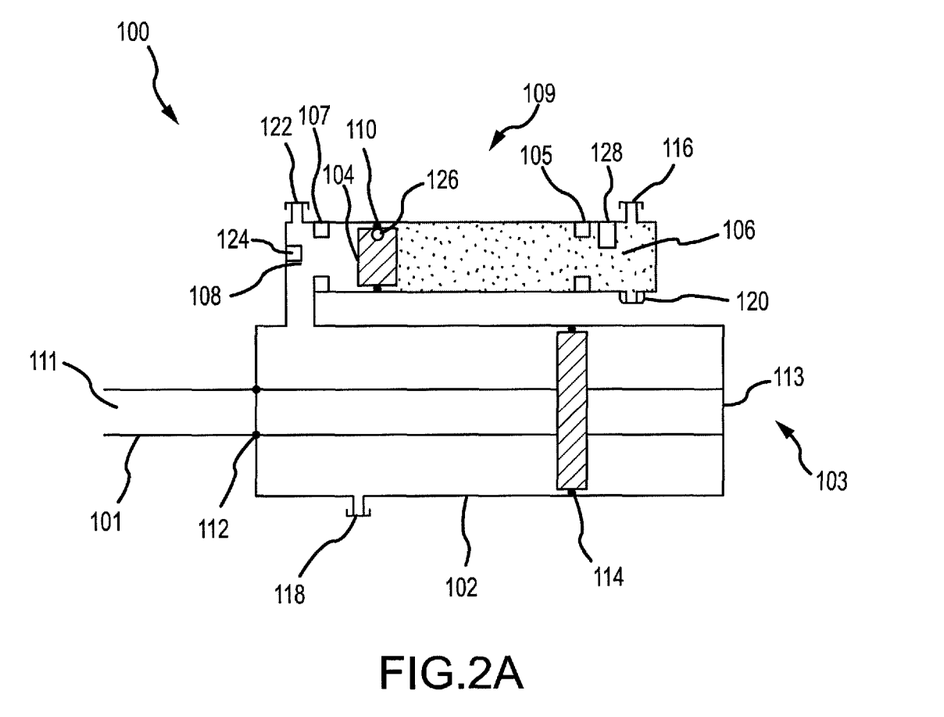
FIG. 2A illustrates a cross section of a pitch trim actuator, in accordance with various embodiments.
Figure 2B:
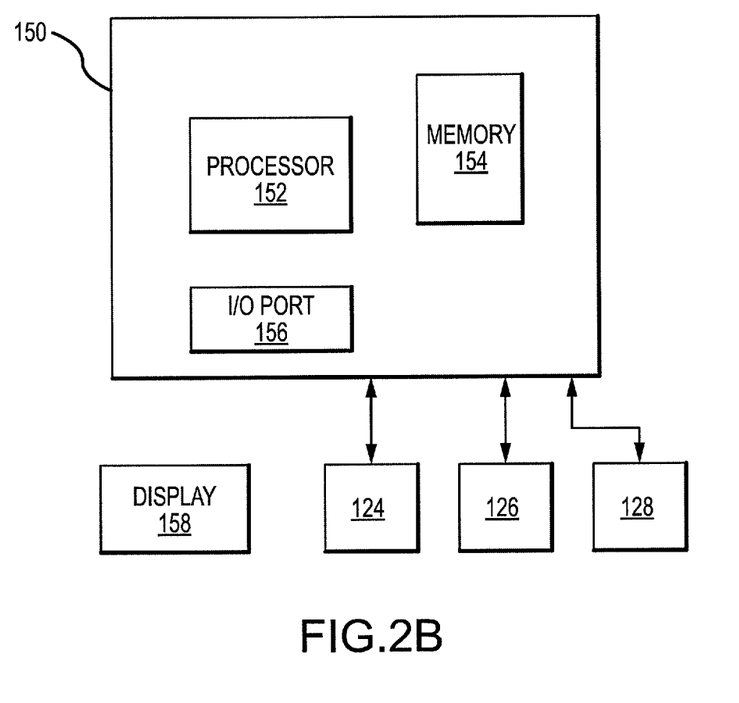
FIG. 2B illustrates a system for determining fluid levels of a pitch trim actuator, in accordance with various embodiments.

Pitch trim actuator 100 has a first terminus 111 (as illustrated in FIG. 2A) and a second terminus 113 (as also illustrated in FIG. 2B). Pitch trim actuator 100 comprises pitch trim actuator piston 101 and pitch trim actuator housing 103. Pitch trim actuator piston 101 is configured to translate within pitch trim actuator housing 103. A hydraulic system may be disposed within pitch trim actuator 100 to damp relative translational motion between pitch trim actuator piston 101 and pitch trim actuator housing 103. Pitch trim actuator 100 may orient bogie beam 4 to the flight position during gear retraction and extension, as well as any other time in which the aircraft is airborn (between take-off and touchdown). Pitch trim actuator 100 may also assist in damping the oscillation of bogie beam 4 relative to strut 2.

With reference to FIG. 2A, the first terminus 111 of pitch trim actuator 100 may comprise a portion of pitch trim actuator piston 101. The first terminus 111 of pitch trim actuator 100 is coupled to a pivot joint 10 of bogie beam 4, with momentary reference to FIG. 1. The second terminus 113 of pitch trim actuator 100 may comprise a portion of pitch trim actuator housing 103. The second terminus 113 of pitch trim actuator 100 may be coupled to strut 2, with momentary reference to FIG. 1. In various embodiments, the first terminus 111 of pitch trim actuator 100 may be coupled to strut 2 and the second terminus 113 of pitch trim actuator 100 may be coupled to pivot joint 10. In various embodiments, pitch trim actuator 100 may be positioned elsewhere in relation to strut 2 and bogie beam 2.

While the discussion herein is directed to pitch trim actuator 100, it will be obvious to one skilled in the art that the systems and methods described herein are applicable to many types of actuators and shocks and struts. Therefore, the disclosure herein is not limited to applications solely directed to pitch trim actuator 100.

FIG. 2A illustrates a cross section of pitch trim actuator 100. Pitch trim actuator 100 includes a main actuator 102 and an accumulator 109. Pitch trim actuator 100 includes pitch trim actuator piston 101 and pitch trim actuator housing 103. Pitch trim actuator 100 includes a gas chamber 106 positioned entirely in accumulator 109. Gas chamber 106 may include a gas, such as air or nitrogen gas. Pitch trim actuator 100 includes an oil chamber 108 positioned within main actuator 102 and accumulator 109. Oil chamber 108 is continuous within main actuator 102 and accumulator 109, and thus main actuator 102 is in fluid communication with accumulator 109 via oil chamber 108. Oil chamber 108 may include hydraulic fluid, such as oil. A separator piston 104 is positioned between gas chamber 106 and oil chamber 108. Mechanical stop 105 and mechanical stop 107 are positioned within accumulator 109. Separator piston 104 may float between mechanical stop 105 and mechanical stop 107. Separator piston 104 separates oil chamber 108 from gas chamber 106. Because separator piston 104 floats, volume of gas chamber 106 and oil chamber 108 are dependent upon position of separator piston 104.

A temperature/pressure sensor 124 may be positioned within oil chamber 108. Temperature/pressure sensor 124 may refer to a single sensor that is adapted to determine the temperature and pressure of oil within oil chamber 108. In various embodiments, temperature/pressure sensor 124 may include a separate temperature sensor and a separate pressure sensor.

A temperature/pressure sensor 128 may be positioned within gas chamber 106. Temperature/pressure sensor 128 may refer to a single sensor that is adapted to determine the temperature and pressure of gas within gas chamber 106. In various embodiments, temperature/pressure sensor 128 may include a separate temperature sensor and a separate pressure sensor.

A position sensor 126 may be positioned within gas chamber 106 and/or within oil chamber 108. Position sensor 126 may be able to determine the position of separator piston 104 relative to accumulator 109 (i.e., the stroke). The position of separator piston 104 may be used to determine a volume of gas chamber 106 and/or oil chamber 108. This is because the total volume of gas chamber 106 and oil chamber 108 is known. By knowing the position of separator position, the volume of gas chamber 106 can be determined. Because the total volume is known, and the volume of the gas chamber 106 is determinable, the volume of oil chamber 108 is also determinable.

Over time, oil and/or gas may leak from pitch trim actuator 100. The pressure of the gas and volume of the oil should be within predetermined ranges for pitch trim actuator 100 to function properly. The leakage of oil and/or gas could cause the pressure of the gas and the volume of the oil to fall outside of the predetermined acceptable range of pressures and volumes.

Three dynamic seals are present in pitch trim actuator 100 from which oil and/or gas can leak. The first seal 110 is positioned around separator piston 104. The second seal 112 is positioned where actuator piston 101 enters housing 103 of pitch trim actuator 100. The third seal 114 is positioned at the end of actuator piston 101 that is within housing 103. In various embodiments, first seal 110, second seal 112 and/or third seal 114 may be positioned elsewhere in pitch trim actuator 100. In various embodiments, pitch trim actuator 100 may include greater or fewer seals than illustrated.

When the oil volume and gas pressure fall outside of the predetermined ranges, the volume of oil can be increased by adding additional oil and/or the gas pressure can be increased by adding oil. Oil bleed interface 122 allows oil to be removed from oil chamber 108. Oil servicing interface 118 allows oil to be added to oil chamber 108.

Likewise, the pressure of the gas may be altered by adding or removing gas from gas chamber 106. Drain interface 120 exists for draining gas from gas chamber 106. Gas servicing interface 116 allows gas to be added to gas chamber 106.

FIG. 2B illustrates a system 150 for determining fluid levels of pitch trim actuator 100. System 150 may be positioned adjacent pitch trim actuator 100 or may be remote from pitch trim actuator 100. System 150 includes a processor 152, a memory 154 and an I/O interface 156. In various embodiments, system 150 may include greater or fewer elements than illustrated in FIG. 2B.

Processor 152 may be a computer processor such as an ARM processor, DSP processor, distributed processor or other form of central processing. Processor 152 may be adapted to run machine-readable instructions.

Memory 154 may be a tangible, non-transitory memory and/or a data storage device, such as a hard disk drive, a solid-state disk drive, a hybrid disk drive, or other appropriate data storage. Memory 154 may further store machine-readable instructions which may be loaded and executed by processor 152.

I/O interface 156 may be any interface capable of allowing data to transfer to and from system 150. For example, I/O interface 156 may support a 802.11a/b/g/n/ac signal (e.g., Wi-Fi), a wireless communications protocol using short wavelength UHF radio waves and defined at least in part by IEEE 802.15.1 (e.g., the BLUETOOTH protocol maintained by Bluetooth Special Interest Group), an infrared signal, an optical signal, or any other signal capable of transmitting and receiving information wirelessly to and from I/O interface 156.

System 150 may be connected to a display 158. Display 158 may be any display capable of providing output to a user, such as an LCD display, an OLED display, a touch screen display or the like.

System 150 may be in logical communication with position sensor 126, temperature/pressure sensor 124 and/or temperature/pressure sensor 128. In that regard, system 150 may send and receive data from position sensor 126, temperature/pressure sensor 124 and/or temperature/pressure sensor 128. Processor 152 may receive data from position sensor 126, temperature/pressure sensor 124, temperature/pressure sensor 128 and/or memory 154. Processor 152 may be adapted to determine the status of oil and gas within pitch trim actuator 100 based on the data received from position sensor 126, temperature/pressure sensor 124, temperature/pressure sensor 128 and/or data stored in memory 154. The status may include oil leakage rates, seal leakage rates, gas leakage rates, estimated number of flight cycles until the next servicing is due and/or current fluid levels of gas and/or oil.

Figure 3:
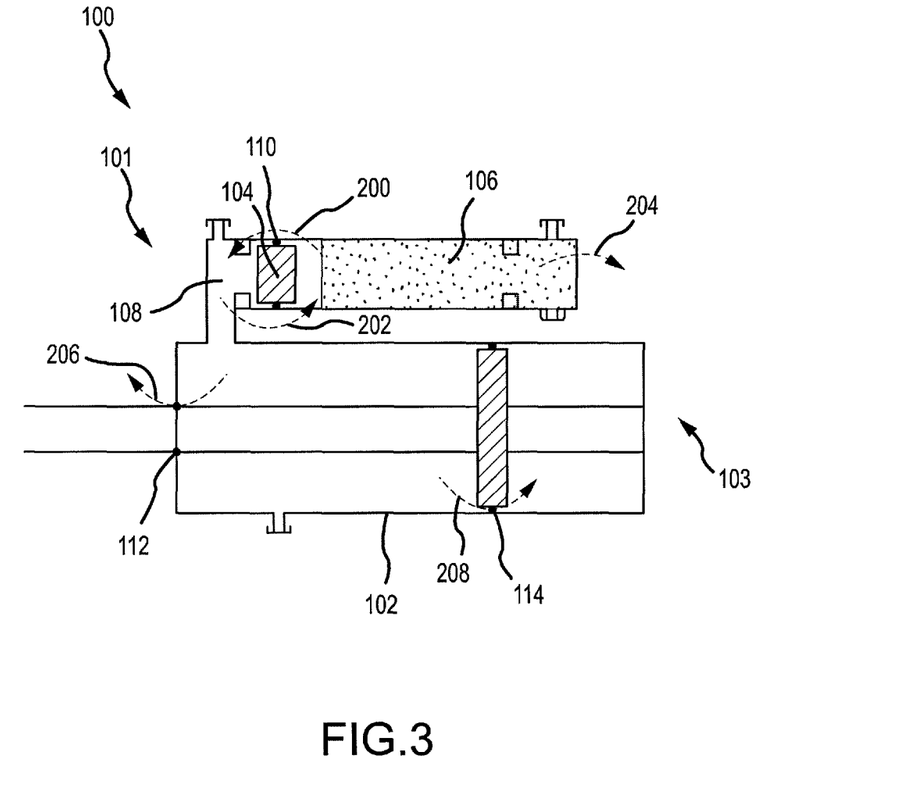
FIG. 3 illustrates a cross section of a pitch trim actuator showing dynamic gas and oil leakage paths, in accordance with various embodiments.

FIG. 3 illustrates a cross section of pitch trim actuator 100 showing dynamic gas and oil leakage paths. A first leakage path 200 may exist around first seal 110 whereby gas exits gas chamber 106 and enters oil chamber 108. If gas leaks via first seal 110 or via a static seal within accumulator 109, no other leakage exists, pressure of the gas in gas chamber 106 will decrease when gas leaks via first leakage path 200. However, the volume of oil will not change because gas that leaks into oil chamber 108 will dissolve in oil and not change the volume of the oil. Gas leakage to the atmosphere also will not change the oil volume. Gas leakage is referred to as gas loss ($n_{gas\_loss}$).

A second leakage path 202 may exist around first seal 110. Oil can leak from oil chamber 108 to gas chamber 106 via second leakage path 202. When this happens, the total oil volume within pitch trim actuator 100 remains unchanged. However, gas pressure drops slightly as some gas is dissolved into the leaked oil. Additionally, separator piston 104 moves towards oil chamber 108, and the volume of oil within oil chamber 108 is decreased. Oil leakage via second leakage path 202 is referred to as leaked oil ($V_{oil\_leaked}$).

The third leakage path 206 exists between housing 103 and pitch trim actuator piston 101. Oil may be displaced from oil chamber 108 to the atmosphere via third leakage path 206. The fourth leakage path 208 exists around the internal end of pitch trim actuator piston 101, such that oil may be displaced from oil chamber 108 into housing 103, which will be considered atmospheric loss. When oil leaks via third leakage path 206 or fourth leakage path 208, oil volume within oil chamber 108 will reduce. When the oil volume is reduced, separator piston 104 moves towards oil chamber 108. This enlarges the volume of gas chamber 106, allowing gas to expand, resulting in a drop of gas pressure. Oil leakage via third leakage path 206 and fourth leakage path 208 is referred to as oil loss ($V_{oil\_loss}$).

When oil and gas leak via first seal 110, second seal 112 and third seal 114, gas pressure drops, oil volume decreases and separator piston 104 moves towards oil chamber. This may change the oil volume and gas pressure of pitch trim actuator 100 to no longer be within the predetermined ranges. Three methods will be described for determining gas loss, leaked oil and oil loss.

Figure 4:
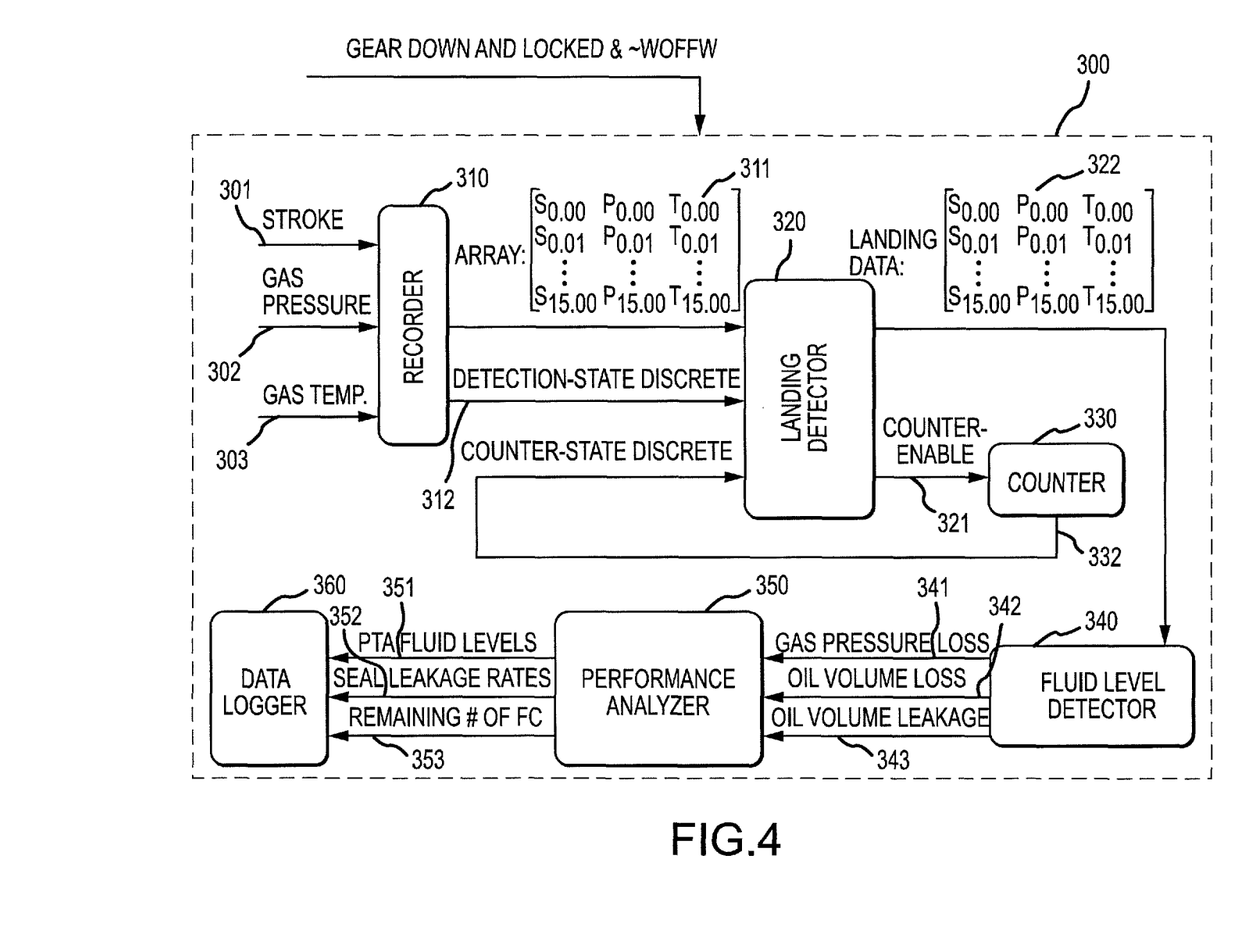
FIG. 4 illustrates a method for monitoring fluid levels and leakage rates within a pitch trim actuator, in accordance with various embodiments.

FIG. 4 illustrates a method 300 for monitoring fluid levels and leakage rates within pitch trim actuator 100.

Method 300 includes at least three inputs. One input is stroke 301, which is the positioning of separator piston 104 within accumulator 109. Stroke 301 may be detected by position sensor 126 on separator piston 104. Gas pressure 302 is another input to method 300. Gas pressure 302 may be detected by gas temperature/pressure sensor 128 within gas chamber 106. Gas temperature 303 is another input to method 300. Gas temperature 303 may be detected by gas temperature/pressure sensor 128 as well.

Method 300 includes a recorder module 310, a landing detector module 320, a counter module 330, a fluid level detector module 340, a performance analyzer module 350 and a data logger module 360. With momentary reference to FIG. 2B, functions performed by each module may be stored in memory 154 and performed using processor 152. Additionally, inputs and outputs from each module may be stored in memory 154.

Recorder module 310 receives the inputs to method 300, including stroke 301, gas pressure 302 and gas temperature 303. Recorder module 310 stores these inputs in an array 311 within memory 154 at a desired frequency, such as, for example, between 1 hertz (Hz) and 100 Hz. Array 311 is a sliding window containing the most recent 15 seconds of data provided to recorder module 310. The data includes the measured positions of separator piston 104, the gas pressure and the gas temperature measured at periodic intervals. When method 300 initializes, 15 seconds of data are not present. Therefore, for the first 15 seconds after initialization, a detection-state discrete signal 312 indicates that sufficient data is unavailable.

Once 15 seconds of data have accumulated, detection-state discrete signal 312 switches, indicating that 15 seconds of data have been collected. After the first 15 seconds post initialization, array 311 will include the first 15 seconds of data. After the first 20 seconds, array 311 will include the data between the five second point and the 20 second point.

Generally, method 300 is initiated after the landing gear is deployed and locked and before landing (i.e., while landing gear is deployed and locked and weight is off wheels (WOFFW)). Method 300 remains active for one minute after landing (or weight on wheels (WOW)). It is desired that the inputs to method 300 are continuously recorded between initiation and one minute post WOW at a rate greater than 100 Hz.

It is desired that the algorithm used by method 300 is performed based on data collected from both pre-WOW and post WOW. Because method 300 only utilizes a small window of data, the identification of time of WOW is useful. Landing detector module 320 determines the time of WOW. Landing detector module 320 also outputs landing data 322, which includes the data of array 311 at a point in time in which array 311 includes pre-WOW and post-WOW data.

Landing detector module 320 receives array 311 as input. Landing detector module 320 compares array 311 against certain criteria. The first criterion is the separator piston 104 displacement within the recorded 15 sets of data and array 311. The specific first criterion is whether the maximum distance from separator piston 104 to one of the mechanical stops ($_{max}(S)$) minus the minimum distance from separator piston 104 to one of the mechanical stops ($_{min}(S)$) is greater than a tunable parameter ($\Delta S$). The first criterion ensures that the set of data is associated with a landing or a takeoff or another event that caused separator piston 104 to become displaced. $\Delta S$ is chosen to be an order of magnitude larger than the possible piston displacement due to temperature variations over a 15 second interval.

The second criterion is that the separator piston displacement for the first 5 seconds of array 311 is less than a tunable parameter (dS). The second criterion ensures that the set of data is associated with a landing event. This is because it ensures that no displacement has been recorded with any first 5 seconds of data in array 311. The second criterion also ensures that the chosen set of data includes 5 seconds of steady state measurements before landing.

If the first and the second criteria are met, the event is categorized as a landing event. When a landing event occurs, landing data 322 is provided as an output and a counter-enable signal is provided to counter module 330.

In various embodiments, it is desired that landing detector module 320 not provide additional landing data after the initial set of landing data 322 is provided. This is because it allows for a low speed processor to be used for the method 300. The counter module 330 ensures this lack of additional landing data from landing detector module 320 for a predetermined period of time. When counter-enable signal 321 is received at counter module 330, counter module 330 sends a counter-state discrete signal 331 to landing detector module 320. While this signal is engaged, landing detector module 320 does not output any more data. For example, the predetermined period of time may be five minutes. The predetermined period of time is sufficient for all modules within method 300 to complete their processing.

Fluid level detector module 340 receives landing data 322 and uses a two-point dynamic check method to determine the levels of oil and gas within pitch trim actuator 100. In order to determine the fluid levels, fluid level detector module 340 makes two assumptions. The first assumption is that transient gas entrainment in the oil that has leaked into accumulator 109 is negligible. The second assumption is that during landing, the gas pressure follows a polytropic compression process with a known polytropic index. The polytropic index can be obtained experimentally. The polytropic index may also change with a compression rate of the oil.

In fluid level detector module 340, oil and gas levels are compared with design values (nominal values) and the oil volume and gas pressure losses are determined.

The algorithm used by fluid level detector module 340 includes complex equations. Equation 1 is used to estimate the volume of oil leakage into gas chamber 106 via oil chamber 108 for the $i^{th}$ landing event after servicing (via second leakage path 202).

$$V_{oil\_leaked\_i@\tilde{T}_{gas\_i,1}} = \frac{\left(V_{acc}(\check{S}_{i,1}) - A(\check{S}_{i,2} - \check{S}_{i,1})\right) \sqrt[n]{\frac{\check{P}_{gas\_i,2}}{\check{P}_{gas\_i,1}}} - V_{acc}(\check{S}_{i,1})}{\sqrt[n]{\frac{\check{P}_{gas\_i,2}}{\check{P}_{gas\_i,1}}} - 1} \quad \text{Eq. (1)}$$

In equation 1, $V_{oil\_leaked\_i@\tilde{T}_{gas\_i,1}}$ indicates the oil volume leaked into gas chamber 106 for the $i^{th}$ landing after servicing. $\check{S}_{i,1}$ is the measured separator piston 104 position (stroke) before landing. $V_{acc}(\check{S}_{i,1})$ is the volume of gas chamber 106 at $\check{S}_{i,1}$. A indicates the area of separator piston 104. $\check{S}_{i,2}$ is the stroke after the landing event. $\check{P}_{gas\_i,2}$ is the transient gas pressure measured at $\check{S}_{i,2}$. $\check{P}_{gas\_i,2}$ is the measured transient pressure of gas during landing at stroke $\check{S}_{i,2}$. n may be a known constant value or a known function of compression rate. $\check{P}_{gas\_i,1}$ is the measured gas pressure before landing at stroke $\check{S}_{i,1}$.

Equation 2 may be used to determine the external oil leakage through second seal 112 and third seal 114 (via third leakage paths 206 and fourth leakage path 208) for the $i^{th}$ landing after servicing.

$$V_{oil\_loss\_i@\tilde{T}_{gas\_i,1}} = A \times (\check{S}_{i,1} - S(\tilde{T}_{gas\_i,1})) - V_{oil\_leaked\_i@\tilde{T}_{gas\_i,1}} \quad \text{Eq. (2)}$$

$V_{oil\_loss\_i@\tilde{T}_{gas\_i,1}}$ indicates the external oil leakage through the second seal 112 and the third seal 114. $S(\tilde{T}_{gas\_i,1})$ indicates the displacement of separator piston 104 relative to a reference position.

The gas loss of pitch trim actuator 100 for the $i^{th}$ landing after servicing may be determined using equation 3.

$$n_{gas\_loss\_i} = \frac{P_{gas,nom} V_{gas,nom}}{RT_{nom}} - \frac{\check{P}_{gas\_i,1} \times \left(V_{acc}(\check{S}_{i,1}) - V_{oil\_leaked\_i@\tilde{T}_{gas\_i,1}}\right)}{R \times \tilde{T}_{gas\_i,1}} \quad \text{Eq. (3)}$$

In equation 3, $n_{gas\_loss\_i}$ indicates the number of moles of gas lost for the $i^{th}$ landing after servicing. $P_{gas,nom}$ indicates nominal gas pressure at the nominal temperature. $V_{gas,nom}$ indicates the nominal gas volume at the nominal temperature. $T_{nom}$ indicates the nominal temperature. R indicates the ideal gas constant.

Equation 4 may be used to determine oil loss adjusted to the nominal temperature and pressure ($V_{oil\_leaked\_i@T_{nom}}$) for the $i^{th}$ landing after servicing.

$$V_{oil\_loss\_i@T_{nom}} = V_{oil\_loss\_i@\tilde{T}_{gas\_i,1}} \times \left(1 + \alpha(T_{nom} - \tilde{T}_{gas\_i,1})\right) \times \left(1 - \frac{\check{P}_{gas\_i,1} - P_{gas,nom}}{B}\right) \quad \text{Eq. (4)}$$

In equation 4, $\alpha$ represents the oil thermal expansion/contraction coefficient and B represents oil bulk modulus.

The leaked oil volume adjusted to the nominal temperature and pressure ($V_{oil\_leaked\_i@T_{nom}}$) is determined using equation 5.

$$V_{oil\_leaked\_i@T_{nom}} = V_{oil\_leaked\_i@\tilde{T}_{gas\_i,1}} \times \left(1 + \alpha(T_{nom} - \tilde{T}_{gas\_i,1})\right) \times \left(1 - \frac{\check{P}_{gas\_i,1} - P_{gas,nom}}{B}\right) \quad \text{Eq. (5)}$$

The gas loss adjusted to the nominal temperature and pressure ($P_{gas\_loss\_i@T_{nom}}$) is determined using equation 6.

$$P_{gas\_loss\_i@T_{nom}} = \frac{n_{gas\_loss\_i} \times R \times T_{nom}}{V_{gas\_nom}} \qquad \text{Eq. (6)}$$

Performance analyzer module 350 receives gas pressure loss 341, oil volume loss 342 and oil volume leakage 343 from fluid level detector module 340 and performs tasks based on these inputs. The first task performed by performance analyzer module 350 is verification of servicing of pitch trim actuator 100. This verification of servicing of pitch trim actuator 100 is only performed for the first landing after servicing of pitch trim actuator 100. The volume of oil in oil chamber 108 ($V_{oil@T_{nom}}$) is determined using equation 7.

$$V_{oil\_1@T_{nom}} = V_{oil\_nom} - V_{oil\_loss\_1@T_{nom}} - V_{oil\_leaked\_1@T_{nom}} \qquad \text{Eq. (7)}$$

In equation 7, $V_{oil\_nom}$ indicates the nominal oil volume. The gas volume in gas chamber 106 ($V_{gas\_1@T_{nom}}$) is determined using equation 8.

$$V_{gas\_1@T_{nom}} = V_{tot} - V_{oil\_1@T_{nom}} - V_{oil\_leaked\_1@T_{nom}} \qquad \text{Eq. (8)}$$

In equation 8, $V_{tot}$ represents the total volume of oil and gas within pitch trim actuator 100.

The pressure of the gas within gas chamber 106 ($P_{gas\_1@T_{nom}}$) can be determined using equation 9.

$$P_{gas\_1@T_{nom}} = \frac{P_{gas\_nom} V_{gas\_nom} - P_{gas\_loss\_1@T_{nom}} V_{gas\_nom}}{V_{gas\_1@T_{nom}}} \qquad \text{Eq. (9)}$$

The total oil volume in pitch trim actuator 100, including oil leaked into gas chamber 106 ($V_{oil\_tot\_1@T_{nom}}$), may be determined using equation 10.

$$V_{oil\_tot\_1@T_{nom}} = V_{oil\_nom} - V_{oil\_loss\_1@T_{nom}} = V_{oil\_1@T_{nom}} + V_{oil\_leaked\_1@T_{nom}} \qquad \text{Eq. (10)}$$

In order to verify the servicing of pitch trim actuator 100, the oil volume and gas pressure are compared with a set of predetermined values. In particular, the volume of the oil in oil chamber 108 is to be greater than a minimum oil volume parameter ($V_{oil,min,servicing}$) and less than a maximum oil volume parameter ($V_{oil,max,servicing}$). The minimum and maximum oil volume parameters are predefined and define the operable conditions of oil volume within pitch trim actuator 100.

The gas pressure in gas chamber 106 is to be greater than a minimum gas pressure parameter ($P_{gas,min,servicing}$) and less than a maximum gas pressure parameter ($P_{gas,max,servicing}$). The minimum and maximum gas pressure parameters are predetermined parameters that indicate the operable conditions of the gas pressure of pitch trim actuator 100. Equation 11 indicates the relationships discussed above.

$$V_{oil,min,servicing} \leq V_{oil\_1@T_{nom}} \leq V_{oil,max,servicing}$$

$$P_{gas,min,servicing} \leq P_{gas\_1@T_{nom}} \leq P_{gas,max,servicing} \qquad \text{Eq. (11)}$$

Performance analyzer module 350 may also determine an average leak rate across first seal 110. Initially after servicing of pitch trim actuator 100, the leakage rate across all seals is expected to be insignificant. In various embodiments, the internal and external leakage rate for the first 100 flight cycles post servicing may not be detectable. Therefore, performance analyzer module 350 devised to apply more weight to the nominal leakage rate of first seal 110 for the first 100 flight cycles. After the first 100 flight cycles post servicing, the leakage volume over the previous 100 flight cycles is used for the determination of the leakage rate.

The leakage across the first seal 110 ($Q_{seal\#1\_i}$) may be determined using equation 12 for the first flight cycle.

$$Q_{seal\#1\_i} = Q_{seal\#1,nom} \text{ for } i=1 \qquad \text{Eq. (12)}$$

In equation 12, $Q_{seal\#1\_nom}$ represents the nominal leakage rate of first seal 110.

The leakage rate of first seal 110 for flights 2 through 100 post servicing may be calculated using equation 13.

$$Q_{seal\#1\_i} = \frac{V_{oil\_leaked\_i@T_{nom}} - V_{oil\_leaked\_1@T_{nom}}}{i} \times \frac{i-1}{99} + Q_{seal\#1,nom} \frac{100-i}{99} \qquad \text{Eq. (13)}$$

for $2 \leq i \leq 100$

In equation 13, $Q_{seal\#1\_i}$ represents the leakage of first seal 110 for the $i^{th}$ landing.

Equation 14 may be used to determine the leakage across first seal 110 for the $i^{th}$ landing after servicing ($Q_{seal\#1\_i}$).

$$Q_{seal\#1\_i} = \frac{V_{oil\_leaked\_i@T_{nom}} - V_{oil\_leaked\_(i-100)@T_{nom}}}{100} \qquad \text{Eq. (14)}$$

for $i > 100$

Equation 15 may be used to determine whether first seal 110 is faulty.

$$Q_{seal\#1\_i} \geq k \times Q_{seal\#1,nom} \qquad \text{Eq. (15)}$$

If equation 15 is satisfied, then it may be concluded that first seal 110 is faulty. In equation 15, k is a tunable parameter.

Performance analyzer module 350 may also determine the average leakage rate across second seal 112 and third seal 114. Equation 16 may be used to determine the average leakage across second seal 112 and third seal 114 for the first landing after servicing.

$$Q_{seal\#2\&3\_i} = Q_{seal\#2\&3,nom} \text{ for } i=1 \qquad \text{Eq. (16)}$$

In equation 16, $Q_{seal\#2\&3\_i}$ represents the oil leakage rate across second seal 112 and third seal 114 and $Q_{seal\#2\&3,nom}$ indicates the nominal leakage rate across second seal 112 and third seal 114.

Equation 17 may be used to determine the leakage rate across second seal 112 and third seal 114 for the $2^{nd}$ through $100^{th}$ landing after servicing.

$$Q_{seal\#2\&3\_i} = \frac{V_{oil\_loss\_i@T_{nom}} - V_{oil\_loss\_1@T_{nom}}}{i-1} \times \frac{i-1}{99} + Q_{seal\#2\&3,nom} \frac{100-i}{99} \qquad \text{Eq. (17)}$$

for $2 \leq i \leq 100$

Equation 18 may be used to determine the oil leakage rate across second seal 112 and third seal 114 for each landing beyond the $100^{th}$ landing.

$$Q_{seal\#2\&3\_i} = \frac{V_{oil\_loss\_i@T_{nom}} - V_{oil\_loss\_(i-100)@T_{nom}}}{100} \quad \text{Eq. (18)}$$

for $i > 100$

The leakage rate across second seal 112 and third seal 114 ($Q_{seal\#2\&3\_i}$) may be compared to the nominal leakage rate across second seal 112 and third seal 114 ($Q_{seal\#2\&3\_nom}$) to determine whether second seal 112 and/or third seal 114 are faulty.

Equation 19 illustrates this comparison.

$$Q_{seal\#2\&3\_i} \geq k \times Q_{seal\#2\&3,nom} \quad \text{Eq. (19)}$$

If Equation 19 is satisfied, second seal 112 and/or third seal 114 are determined to be faulty. In equation 19, k is a tunable parameter and may be set to a different value than k in equation 15.

Performance analyzer module 350 may also determine the rate of gas leakage ($Q_{gas\_loss\_i}$). Equation 20 indicates that the gas loss for the first landing after servicing is 0.

$$Q_{gas\_loss\_i} = 0 \text{ for } i=1 \quad \text{Eq. (20)}$$

Equation 21 may be used to determine the gas leakage for the $2^{nd}$ to $100^{th}$ landing $$Q_{gas\_loss\_i} = \frac{P_{gas\_loss\_i@T_{nom}} - P_{gas\_loss\_1@T_{nom}}}{i-1} \quad \text{Eq. (21)}$$

Equation 22 may be used to determine gas leakage after the first 100 landings post servicing.

$$Q_{gas\_loss\_i} = \frac{V_{gas\_loss\_i@T_{nom}} - P_{gas\_loss\_(i-100)@T_{nom}}}{100} \quad \text{Eq. (22)}$$

The following equations may be used to determine the number of flight cycles remaining until servicing is required. Equation 23 may be used to determine the remaining oil volume after the $i^{th}$ landing after servicing at the nominal temperature. ($V_{oil\_loss\_i@T_{nom}}$).

$$V_{oil\_i@T_{nom}} = V_{oil,nom} - V_{oil\_loss\_i@T_{nom}} - V_{oil\_leaked\_i@T_{nom}} \quad \text{Eq. (23)}$$

Equation 24 may be used to determine the volume of gas remaining after the $i^{th}$ landing after servicing at the nominal temperature ($V_{gas\_i@T_{nom}}$).

$$V_{gas\_i@T_{nom}} = V_{tot} - V_{oil\_i@T_{nom}} - V_{oil\_leaked\_i@T_{nom}} \quad \text{Eq. (24)}$$

Equation 25 may be used to determine the gas pressure after the $i^{th}$ landing after servicing at the nominal temperature ($P_{gas\_i@T_{nom}}$).

$$P_{gas\_i@T_{nom}} = \frac{P_{gas,nom}V_{gas,nom} - P_{gas\_loss\_i@T_{nom}}V_{gas,nom}}{V_{gas\_i@T_{nom}}} \quad \text{Eq. (25)}$$

Equation 26 may be used to determine the total volume of oil after the $i^{th}$ landing post servicing at the nominal temperature ($V_{oil\_tot\_i@T_{nom}}$).

$$V_{oil\_tot\_i@T_{nom}} = V_{oil,nom} - V_{oil\_loss\_i@T_{nom}} \quad \text{Eq. (26)}$$

Once the current fluid levels are calculated using equations 23-26, the fluid levels are adjusted to negative fifty-five degrees Celsius (−55° C.) using equations 27-29.

Equation 27 may be used to determine the volume of oil after the $i^{th}$ landing adjusted to −55° C. ($V_{oil\_tot\_i@-55C}$).

$$V_{oil\_i@-55\,C.} = \quad \text{Eq. (27)}$$
$$V_{oil\_i@T_{nom}}(1 + \alpha(-55 - T_{nom}))\left(1 - \frac{P_{gas\_i@-55\,C.} - P_{gas\_i@T_{nom}}}{B}\right)$$

Equation 28 may be used to determine the total volume of oil after the $i^{th}$ landing at −55° C. ($V_{oil\_tot\_i@-55C}$).

$$V_{oil\_tot\_i@-55\,C.} = V_{oil\_tot\_i@T_{nom}}(1 + \alpha(-55 - T_{nom})) \quad \text{Eq. (28)}$$
$$\left(1 - \frac{P_{gas\_i@-55\,C.} - P_{gas\_i@T_{nom}}}{B}\right)$$

Equation 29 may be used to calculate the total gas pressure after the $i^{th}$ landing at −55° C. ($P_{gas\_i@-55C}$).

$$P_{gas\_i@-55\,C.} = \quad \text{Eq. (29)}$$
$$\left(\frac{P_{gas\_i@T_{nom}}V_{gas\_i@T_{nom}}}{T_{nom}}\right)(273-55)\frac{1}{V_{tot} - V_{oil\_tot\_i@-55\,C.}}$$

After the fluid levels are adjusted to −55° C., the number of flight cycles to the next servicing is determined. N−1 represents the number of flight cycles remaining until the next servicing. In step 1 of determining the number of flight cycles to the next servicing, N is set to 0. As a second step, the volume of oil at the $i+N^{th}$ landing after servicing adjusted to −55° C. ($V_{oil\_(i+N)@-55C}$) is set equal to the volume of oil after the $i^{th}$ landing adjusted to −55° C. Also, the gas pressure at the $i+N^{th}$ landing after servicing adjusted to −55° ($P_{gas\_(i+N)@-55C}$) is set to the gas pressure after the $i^{th}$ landing adjusted to −55° C.

Third, equations 30-32 are solved to determine the oil volume after the $i+N^{th}$ landing adjusted to −55° C. and the gas pressure after the $i+N^{th}$ landing adjusted to −55° C.

$$V_{oil\_(i+N)@-55\,C.} = (V_{oil\_i@T_{nom}} - N \times (Q_{seal\#1} + Q_{seal\#2,3})) \quad \text{Eq. (30)}$$
$$(1 + \alpha(-55 - T_{nom}))\left(1 - \frac{P_{gas\_(i+N)@-55\,C.} - P_{gas\_i@T_{nom}}}{B}\right)$$

$$V_{oil\_tot\_(i+N)@-55\,C.} = (V_{oil\_tot\_i@T_{nom}} - N \times (Q_{seal\#2,3})) \quad \text{Eq. (31)}$$
$$(1 + \alpha(-55 - T_{nom}))\left(1 - \frac{P_{gas\_(i+N)@-55\,C.} - P_{gas\_i@T_{nom}}}{B}\right)$$

$$P_{gas\_(i+N)@-55\,C.} = \quad \text{Eq. (32)}$$
$$\left(\frac{P_{gas\_i@T_{nom}}V_{gas\_i@T_{nom}}}{T_{nom}} - N \times Q_{gas-loss}\frac{V_{gas\_nom}}{T_{nom}}\right)$$
$$(273-55)\frac{1}{V_{tot} - V_{oil\_tot\_(i+N)@-55\,C.}}$$

While ($V_{oil\_(i+N)@-55C}$) is greater than ($V_{oil\_min}$) and ($P_{gas\_(i+N)@-55C}$) is greater than ($P_{gas\_min}$), N is incremented by one and equations 30-32 are solved. When either of the conditions above is not satisfied, the method 300 stops solving equations 30-32. The number of flight cycles to the next servicing is then set to be N−1. If the number of flight cycles to the next servicing is less than a predetermined threshold, for example, 10, then this information is provided to the maintenance crew for preparation for pitch trim actuator 100 servicing. When N equals 1, servicing is due.

Data logger module 360 may receive the fluid levels 351, seal leakage rates 352 and remaining number of flight cycles 353 and register them after each landing event. Information saved via data logger module 360 may be available for retrieval from a maintenance system.

Figure 5:
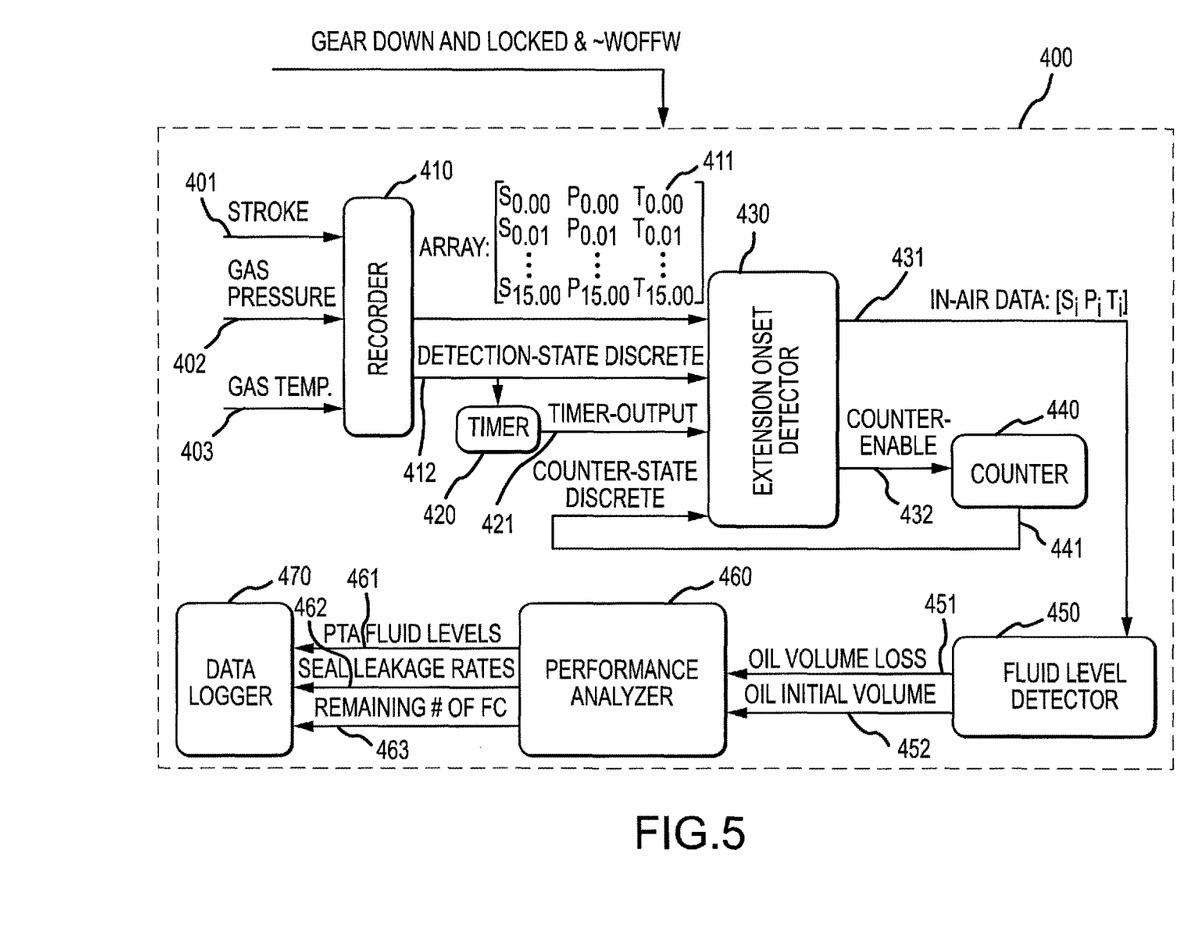
FIG. 5 illustrates a method for determining fluid levels and leakage rates within a pitch trim actuator, in accordance with various embodiments.

Discussion now turns to another method for determining fluid and gas levels and leakage rates. FIG. 5 illustrates a method 400 for determining fluid and gas levels and leakage rates within pitch trim actuator 100. Method 400 receives three inputs: stroke 401, gas pressure 402 and gas temperature 403. Stroke 401 may be detected by position sensor 126. Gas pressure 402 and/or gas temperature 403 may be determined by gas temperature/pressure sensor 128.

Method 400 includes a recorder module 410, a timer module 420, an extension onset detector module 430, a counter module 440, a fluid level detector module 450, a performance analyzer module 460 and a data logger module 470. Each of these modules may include an algorithm that is stored in memory 154 and performed by the processor 152. Additionally, inputs and outputs from each module may be stored in memory 154.

Recorder module 410 operates in the same fashion as recorder module 310 of method 300. The only difference between recorder module 410 and recorder module 310 is that recorder module 410 provides array 411 that includes 5 seconds worth of data that is collected WOFFW instead of 15 seconds of data including WOFFW and WOW data.

Method 400 is initialized after the landing gear has been deployed for landing and during WOFFW. Method 400 continues to function until WOW occurs. Stroke 401, gas pressure 402 and gas temperature 403 are continuously recorded during this time period at a desired frequency, such as, for example, greater than 100 Hz. Stroke 401, gas pressure 402 and gas temperature 403 are stored in array 411. In various embodiments, method 400 may be applied at any point during WOW.

After 5 seconds of data is collected by recorder module 410, detection-state discrete signal 412 indicates that 5 seconds of data has been recorded and array 411 includes a full 5 seconds of data. When this happens, array 411 is provided to extension onset detector module 430. Also, timer module 420 is activated via detection-state discrete signal 412. Timer module 420 may count an amount of time, such as 10 seconds, from receipt of detection-state discrete signal 412.

Extension onset detector module 430 receives array 411 and computes the average value of stroke 401, gas pressure 402 and gas temperature 403 provided in array 411. Extension onset detector module 430 provides the computed average values (as in-air data 431) of these parameters (in-air data 431) to fluid level detector module 450 in response to timer module 420 finishing its countdown. By waiting for timer module 420 to countdown, it is ensured that measurements within array 411 are taken once pitch trim actuator 100 internal fluids are stabilized for at least the amount of time set within timer module 420 post gear extension.

Once in-air data 431 is provided to fluid level detector module 450, counter module 440 is initialized. Counter module 440 operates the same as counter module 330 in method 300.

Fluid level detector module 450 uses a one point static check method to determine internal fluid levels of pitch trim actuator 100. Algorithms within fluid level detector module 450 are based on two assumptions. The first assumption is that no gas loss occurs over the entire operation of pitch trim actuator 100. The second assumption is that no oil exists in accumulator 109 after servicing.

In-air data 431 includes average gas pressure ($P_{gas\_1,1}$), average gas temperature ($T_{gas\_1,1}$) and average separator piston position ($S_{1,1}$) that were determined in extension onset detector module 430. Fluid level detector module 450 calculates internal fluid levels of pitch trim actuator 100 adjusted to the nominal temperature by solving equations 33-36.

$$V_{oil\_1@T_{nom}} = \left(V_{tot} - V_{gas\_1@\tilde{T}_{gas\_1,1}}\right)$$ Eq. (33)

$$\left(1 + \alpha\left(T_{nom} - \tilde{T}_{gas\_1,1}\right)\right)\left(1 - \frac{P_{gas\_1@T_{nom}} - \tilde{P}_{gas\_1,1}}{B}\right)$$

$$P_{gas\_1@T_{nom}} = \frac{\tilde{P}_{gas\_1,1} V_{gas\_1@\tilde{T}_{gas\_1,1}}}{\tilde{T}_{gas\_1,1}} \frac{T_{nom}}{V_{tot} - V_{oil\_1@T_{nom}}}$$ Eq. (34)

$$V_{gas\_1@T_{nom}} = V_{tot} - V_{oil\_1@T_{nom}}$$ Eq. (35)

where $V_{gas\_1@\tilde{T}_{gas\_1,1}} = V_{acc}\left(\tilde{S}_{1,1}\right)$ Eq. (36)

assuming zero oil volume in the gas chamber $V_{oil\_1@nom}$ and $P_{gas\_1@T_{nom}}$, the internal fluid levels immediately after servicing of pitch trim actuator 100, are utilized as reference values and used for seal leakage quantification for subsequent landings.

Equations 37-40 are used to determine the separator piston 104 reference position (S(T)).

$$V_{oil@T} = V_{oil\_1@T_{nom}}(1 + \alpha(T - T_{nom}))\left(1 - \frac{P_{gas@T} - P_{gas\_1@T_{nom}}}{B}\right)$$ Eq. (37)

$$P_{gas@T} = \frac{P_{gas\_1@T_{nom}} V_{gas\_1@T_{nom}}}{T_{nom}} \frac{T}{V_{gas@T}}$$ Eq. (38)

$$V_{gas@T} = V_{tot} - V_{oil@T}$$ Eq. (39)

$$S(T) = S(T_{nom}) + \frac{(V_{oil\_1@T_{nom}} - V_{oil@T})}{A}$$ Eq. (40)

Equation 41 may be used to calculate the volume of oil leaked after the $i^{th}$ landing post servicing $$\left(V_{oil\_leaked\_i@T_{gas\_i,1}}\right).$$

$$V_{oil\_leaked\_i@\tilde{T}_{gas\_i,1}} = V_{acc}\left(\tilde{S}_{i,1}\right) - \frac{P_{gas\_1@T_{nom}} V_{gas\_1@T_{nom}}}{T_{nom}} \frac{\tilde{T}_{gas\_i,1}}{\tilde{P}_{gas\_i,1}}$$ Eq. (41)

Equation 42 may be used to determine the oil loss after the $i^{th}$ landing post servicing $$\left(V_{oil\_loss\_i@T_{gas\_1,1}}\right).$$

$$V_{oil\_loss\_i@\tilde{T}_{gas\_i,1}} = A \times \left(\tilde{S}_{i,1} - S(T_{gas\_i,1})\right) - V_{oil\_leaked\_i@\tilde{T}_{gas\_i,1}}.$$ Eq. (42)

Equation 43 may be used to determine the volume of oil loss adjusted to the nominal temperature $$(V_{oil\_loss\_i@T_{nom}}).$$

$$V_{oil\_loss\_i@T_{nom}} = V_{oil\_loss\_i@\breve{T}_{gas\_i,1}} \times \qquad \text{Eq. (43)}$$
$$\left(1 + \alpha\left(T_{nom} - \breve{T}_{gas\_i,1}\right)\right) \times \left(1 - \frac{\breve{P}_{gas\_i,1} - P_{gas\_nom}}{B}\right)$$

Equation 44 may be used to determine the volume of oil leaked through first seal 110 adjusted to the nominal temperature $$(V_{oil\_leaked\_i@T_{nom}}).$$

$$V_{oil\_leaked\_i@T_{nom}} = V_{oil\_leaked\_i@\breve{T}_{gas\_i,1}} \times \qquad \text{Eq. (44)}$$
$$\left(1 + \alpha\left(T_{nom} - \breve{T}_{gas\_i,1}\right)\right) \times \left(1 - \frac{\breve{P}_{gas\_i,1} - P_{gas\_nom}}{B}\right)$$

Performance analyzer module 460 operates the same as performance analyzer module 350. Performance analyzer module 460 uses the values determined in fluid level detector module 450 to solve the equations given in performance analyzer module 350. The only difference between performance analyzer module 460 and performance analyzer module 350 is that performance analyzer module 460 does not determine a gas leakage rate.

Data logger module 470 operates in the same fashion as data logger module 360.

Figure 6:
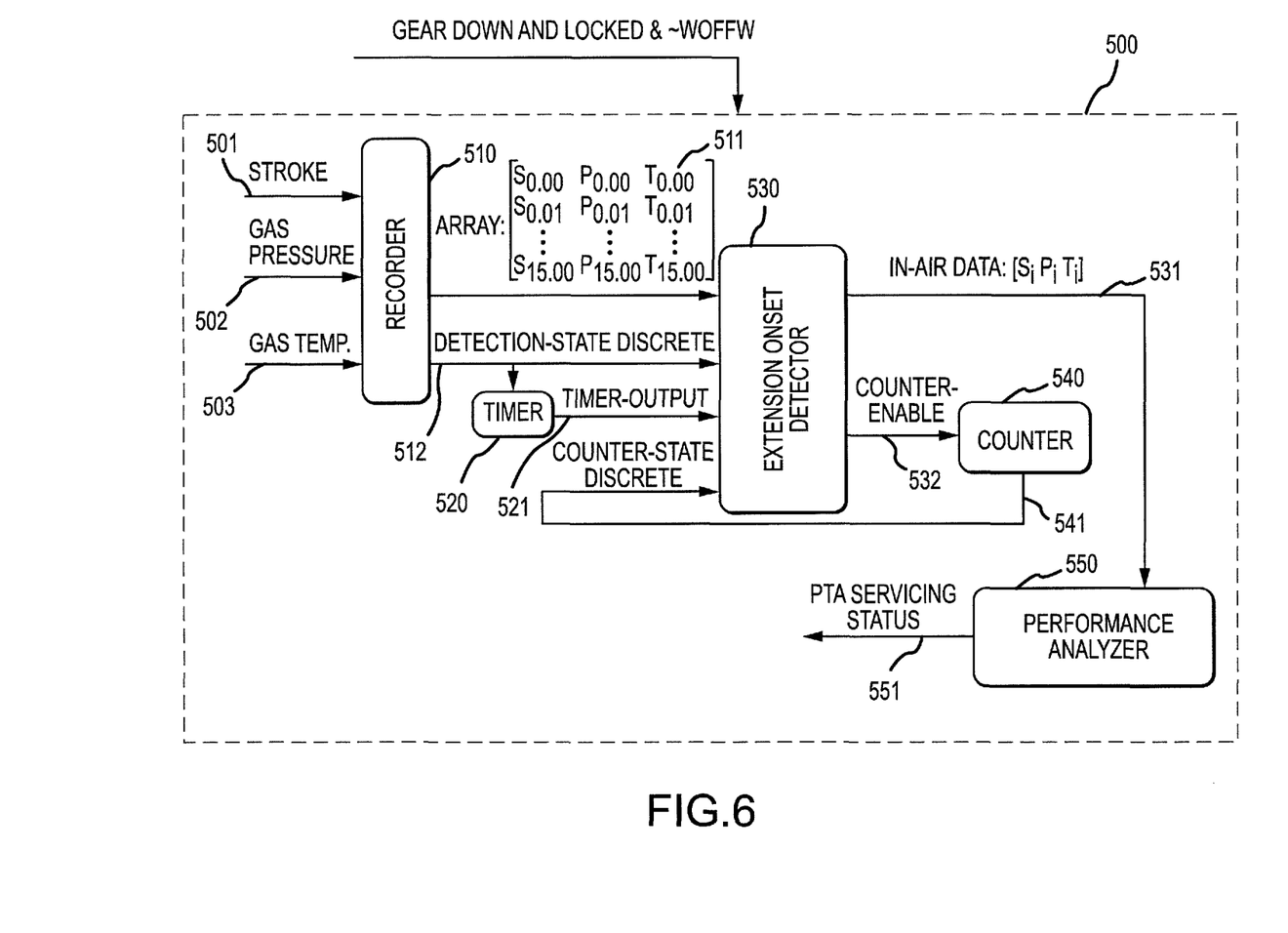
FIG. 6 illustrates a method for determining a servicing status of a pitch trim actuator, in accordance with various embodiments.

Discussion now turns to another method for determining a servicing status. FIG. 6 illustrates a method 500 for determining a servicing status of pitch trim actuator 100. Method 500 receives stroke 501 as an input. Method 500 may also receive gas pressure 502 and gas temperature 503 as an input. In various embodiments, method 500 may receive oil pressure and oil temperature as inputs via temperature/pressure sensor 124 instead of gas pressure 502 and gas temperature 503.

Method 500 may include a recorder module 510, a timer module 520, an extension onset detector module 530, a counter module 540 and a performance analyzer module 550. Each module may perform an algorithm that is stored in memory 154 and performed by processor 152. Additionally, inputs outputs from each module may be stored in memory 154.

Recorder module 510 provides array 511 as output. Array 511 includes 5 seconds of data input collected after the landing gear has been extended and during WOFFW. Array 511 may include a position of separator piston 104 and either gas temperature and gas pressure or oil pressure and oil temperature.

Timer module 520, extension onset detector module 530 and counter module 540 operate the same as timer module 420, extension onset detector module 430 and counter module 440. In various embodiments, method 500 may be applied at any point during WOW. Detection state discreet signal 512, counter enable signal 532, counter state discreet signal 541 and timer output 521 operate the same as detection-state discrete signal 412, counter enable signal 432, counter state discreet signal 441 and timer output signal 421.

In-air data 531 includes an average stroke 501, an average oil or gas pressure 502 and an average oil or gas temperature 503 calculated from array 511. Either oil pressure and oil temperature or gas pressure and gas temperature are provided in in-air data 531.

Performance analyzer module 550 uses a one point static check method to verify performance of pitch trim actuator 100. The total oil volume in oil chamber 108 shall be above a certain threshold in order to ensure that oil in main actuator 102 is maintained pressurized at −55° C. This ensures that separator piston 104 does not "bottom out," (i.e., hit mechanical stop 107) thus degrading operation of pitch trim actuator 100. Oil pressure may also be above a certain threshold at −55° C. to support loads of bogie beam 4.

Before the first landing after servicing pitch trim actuator 100, the measured oil (or gas) pressure ($P_{oil\_1,1}$), oil (or gas) temperature ($T_{oil\_1,1}$) and separator piston position ($S_{1,1}$) are received at performance analyzer module 550. Performance analyzer module 550 then calculates internal fluid levels at the nominal temperature by solving equations 45-48.

$$V_{oil\_1@\breve{T}_{oil\_1,1}} = \left(V_{tot} - V_{acc}(\breve{S}_{1,1})\right) \qquad \text{Eq. (45)}$$

$$V_{gas\_1@\breve{T}_{oil\_1,1}} = V_{acc}(\breve{S}_{1,1}) \qquad \text{Eq. (46)}$$

$$P_{gas\_1@\breve{T}_{oil\_1,1}} = \breve{P}_{oil\_1,1} \qquad \text{Eq. (47)}$$

$$T_{gas\_1} = \breve{T}_{oil\_1,1} \qquad \text{Eq. (48)}$$

Performance analyzer module 550 makes the assumption that no leakage occurred over the first flight and that friction of separator piston 104 is nonexistent.

For each landing subsequent to the first landing post servicing, oil volume $$(V_{oil\_i@T_{oil\_i,1}})$$

is determined using Equation 49, gas pressure $$(P_{gas\_i@T_{oil\_i,1}})$$

is calculated using Equation 50 and gas temperature ($T_{gas\_i}$) is estimated to be equal to the oil temperature, as illustrated in Equation 51.

$$V_{oil\_i@\breve{T}_{oil\_i,1}} = \left(V_{tot} - V_{acc}(\breve{S}_{i,1})\right) \qquad \text{Eq. (49)}$$

$$P_{gas\_i@\breve{T}_{oil\_i,1}} = \breve{P}_{oil\_i,1} \qquad \text{Eq. (50)}$$

$$T_{gas\_i} = \breve{T}_{oil\_i,1} \qquad \text{Eq. (51)}$$

In Equations 52-57, the oil volume and gas pressure are adjusted to −55° C. to verify that they will remain above corresponding thresholds at that temperature.

$$V_{oil\_i@-55\ C.} = V_{oil\_i@\breve{T}_{oil\_i,1}}\left(1+\alpha\left(-55-\breve{T}_{oil\_i,1}\right)\right)\left(1-\frac{P_{oil\_i@-55\ C.}-P_{oil\_i,1}}{B}\right) \quad \text{Eq. (52)}$$

$$V_{gas\_i@-55\ C.} = V_{tot} - V_{oil\_1@\breve{T}_{oil\_1,1}}\left(1+\alpha\left(-55-\breve{T}_{oil\_1,1}\right)\right)\left(1-\frac{P_{oil\_i@-55\ C.}-\breve{P}_{oil\_1,1}}{B}\right) \quad \text{Eq. (53)}$$

$$V_{gas\_i@\breve{T}_{oil\_i,1}} = V_{tot} - V_{oil\_1@\breve{T}_{oil\_1,1}}\left(1+\alpha\left(\breve{T}_{oil\_i,1}-\breve{T}_{oil\_1,1}\right)\right)\left(1-\frac{\breve{P}_{oil\_i,1}-\breve{P}_{oil\_1,1}}{B}\right) \quad \text{Eq. (16)}$$

$$P_{gas\_i@-55\ C.} = \frac{P_{gas\_i@\breve{T}_{oil\_i,1}} V_{gas\_i@\breve{T}_{oil\_i,1}}}{T_{oil\_i,1}} \frac{218}{V_{gas\_i@-55\ C.}} \quad \text{Eq. (55)}$$

$$P_{gas\_i@\breve{T}_{oil\_i,1}} = \breve{P}_{oil\_i,1} \quad \text{Eq. (56)}$$

$$P_{oil\_i@-55\ C.} = P_{gas\_i@-55\ C.} \quad \text{Eq. (57)}$$

If the oil pressure adjusted to −55° C. is greater than a threshold ($P_{oil\_stage\_1}$) and the oil volume adjusted to −55° C. is greater than a threshold ($V_{oil\_stage\_1}$) then pitch trim actuator 100 can be operated safely. If either oil volume or oil pressure is below its corresponding threshold but above a minimum threshold, then servicing will be due in a predetermined number of cycles. These relationships are illustrated in equations 58-61.

$$P_{oil\_i@-55C} > P_{oil\_stage\_1} \quad \text{Eq. (58)}$$

$$V_{oil\_i@-55C} > V_{oil\_stage\_1} \quad \text{Eq. (59)}$$

$$P_{oil\_stage\_1} > P_{oil\_i@-55C} > P_{oil\_min} \quad \text{Eq. (60)}$$

$$V_{oil\_stage\_1} > V_{oil\_i@-55C} > V_{oil\_min} \quad \text{Eq. (61)}$$

If the oil pressure or oil volume is less than the minimum threshold, then pitch trim actuator 100 should not be operated and should be serviced prior to any future landing event. These relationships are illustrated in equations 62 and 63.

$$P_{oil\_i@-55C} < P_{oil\_min} \quad \text{Eq. (62)}$$

$$V_{oil\_i@-55C} < V_{oil\_min} \quad \text{Eq. (63)}$$

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for determining a status of fluids within a pitch trim actuator of an aircraft comprising:
    detecting, by a position sensor, at least one position measurement of a separator piston of the pitch trim actuator;
    detecting, by a pressure sensor, at least one pressure measurement of a gas within a gas chamber of the pitch trim actuator;
    detecting, by a temperature sensor, at least one temperature measurement of the gas within the gas chamber of the pitch trim actuator;
    storing, in a tangible, non-transitory memory, at least one position value based on the at least one position measurement of the separator piston, at least one pressure value based on the at least one pressure measurement of the gas and at least one temperature value based on the at least one temperature measurement of the gas;
    determining, by a processor, a volume of an oil within an oil chamber of the pitch trim actuator and a pressure of the gas within the gas chamber of the pitch trim actuator, based on the at least one position value, the at least one pressure value and the at least one temperature value; and
    determining, by the processor, a loss volume of the oil that has leaked from the oil chamber to a location other than the gas chamber based on the at least one position value, the at least one pressure value and the at least one temperature value.

2. The method of claim 1, wherein:
the at least one position value includes a first position measurement of the separator piston before a landing of the aircraft and a second position measurement of the separator piston during the landing of the aircraft;
the at least one pressure value includes a first pressure measurement of the gas before the landing of the aircraft and a second pressure measurement of the gas during the landing of the aircraft; and
the at least one temperature value includes a first temperature measurement of the gas before the landing of the aircraft and a second temperature measurement of the gas during the landing of the aircraft.

3. The method of claim 1, wherein:
the at least one position measurement of the separator piston includes at least two position measurements of the separator piston before a landing of the aircraft;
the at least one pressure measurement of the gas includes at least two stored pressure measurements of the gas before the landing of the aircraft;
the at least one temperature measurement of the gas includes at least two stored temperature measurements of the gas before the landing of the aircraft;
the at least one position value includes an average of the at least two position measurements of the separator piston;
the at least one pressure value includes an average of the at least two stored pressure measurements of the gas; and
the at least one temperature value includes an average of the at least two stored temperature measurements of the gas.

4. The method of claim 1, further comprising determining, by the processor, a time of a landing of the aircraft based on the at least one position value, the at least one pressure value and the at least one temperature value.

5. The method of claim 1, further comprising:
determining, by the processor, an adjusted volume of gas and an adjusted volume of oil in the pitch trim actuator adjusted to a lowest operating temperature based on the volume of gas and the volume of oil; and
comparing, by the processor, the adjusted volume of gas and the adjusted volume of oil in the pitch trim actuator adjusted to the lowest operating temperature to a set of predetermined thresholds.

6. The method of claim 1, further comprising determining, by the processor, a pressure loss within the gas chamber based on the at least one position value, the at least one pressure value and the at least one temperature value.

7. The method of claim 1, further comprising determining, by the processor, a remaining number of flight cycles until the gas or the oil is due for service.

8. The method of claim 1, further comprising determining, by the processor, a leakage rate of a seal of the gas chamber.

9. The method of claim 1, further comprising determining, by the processor, a leakage rate of a seal of the oil chamber.

10. A method for determining a status of fluids within a pitch trim actuator of an aircraft comprising:
detecting, by a position sensor, at least one position measurement of a separator piston of the pitch trim actuator;
detecting, by a pressure sensor, at least one pressure measurement of a gas within a gas chamber of the pitch trim actuator;
detecting, by a temperature sensor, at least one temperature measurement of the gas within the gas chamber of the pitch trim actuator;
storing, in a tangible, non-transitory memory, at least one position value based on the at least one position measurement of the separator piston, at least one pressure value based on the at least one pressure measurement of the gas and at least one temperature value based on the at least one temperature measurement of the gas;
determining, by a processor, a volume of an oil within an oil chamber of the pitch trim actuator and a pressure of the gas within the gas chamber of the pitch trim actuator, based on the at least one position value, the at least one pressure value and the at least one temperature value; and
determining, by the processor, a leakage volume of oil that has leaked from the oil chamber into the gas chamber based on the at least one position value, the at least one pressure value and the at least one temperature value.

11. The method of claim 10, wherein:
the at least one position value includes a first position measurement of the separator piston before a landing of the aircraft and a second position measurement of the separator piston during the landing of the aircraft;
the at least one pressure value includes a first pressure measurement of the gas before the landing of the aircraft and a second pressure measurement of the gas during the landing of the aircraft; and
the at least one temperature value includes a first temperature measurement of the gas before the landing of the aircraft and a second temperature measurement of the gas during the landing of the aircraft.

12. The method of claim 10, wherein:
the at least one position measurement of the separator piston includes at least two position measurements of the separator piston before a landing of the aircraft;
the at least one pressure measurement of the gas includes at least two stored pressure measurements of the gas before the landing of the aircraft;
the at least one temperature measurement of the gas includes at least two stored temperature measurements of the gas before the landing of the aircraft;
the at least one position value includes an average of the at least two position measurements of the separator piston;
the at least one pressure value includes an average of the at least two stored pressure measurements of the gas; and
the at least one temperature value includes an average of the at least two stored temperature measurements of the gas.

13. The method of claim 10, further comprising determining, by the processor, a time of a landing of the aircraft based on the at least one position value, the at least one pressure value and the at least one temperature value.

14. The method of claim 10, further comprising:
determining, by the processor, an adjusted volume of gas and an adjusted volume of oil in the pitch trim actuator adjusted to a lowest operating temperature based on the volume of gas and the volume of oil; and
comparing, by the processor, the adjusted volume of gas and the adjusted volume of oil in the pitch trim actuator adjusted to the lowest operating temperature to a set of predetermined thresholds.

15. A method for determining a status of fluids within a pitch trim actuator of an aircraft comprising:

detecting, by a position sensor, at least one position measurement of a separator piston of the pitch trim actuator;

detecting, by a pressure sensor, at least one pressure measurement of a gas within a gas chamber of the pitch trim actuator;

detecting, by a temperature sensor, at least one temperature measurement of the gas within the gas chamber of the pitch trim actuator;

storing, in a tangible, non-transitory memory, at least one position value based on the at least one position measurement of the separator piston, at least one pressure value based on the at least one pressure measurement of the gas and at least one temperature value based on the at least one temperature measurement of the gas; and determining, by a processor, a volume of an oil within an oil chamber of the pitch trim actuator and a pressure of the gas within the gas chamber of the pitch trim actuator, based on the at least one position value, the at least one pressure value and the at least one temperature value, wherein determining the volume of the oil in the oil chamber includes determining a volume of oil that leaked from the oil chamber to a position external to the pitch trim actuator using an equation:

$$V_{oil\_loss\_i@\tilde{T}_{gas\_i,1}} = A \times (\tilde{S}_{i,1} - S(\tilde{T}_{gas\_i,1})) - V_{oil\_leaked\_i@\tilde{T}_{gas\_i,1}}$$

wherein $V_{oil\_leaked\_i@\tilde{T}_{gas\_i,1}}$ represents the volume of oil that leaked from the oil chamber to the position external to the pitch trim actuator, A represents an area of the separator piston, $\tilde{S}_{i,1}$ represents a first position value, $S(\tilde{T}_{gas\_i,1})$ represents a displacement of the separator piston relative to a reference position and $V_{oil\_leaked\_i@\tilde{T}_{gas\_i,1}}$ represents a volume of oil that has leaked into the gas chamber.

16. The method of claim 15, wherein:

the at least one position value includes a first position measurement of the separator piston before a landing of the aircraft and a second position measurement of the separator piston during the landing of the aircraft;

the at least one pressure value includes a first pressure measurement of the gas before the landing of the aircraft and a second pressure measurement of the gas during the landing of the aircraft; and the at least one temperature value includes a first temperature measurement of the gas before the landing of the aircraft and a second temperature measurement of the gas during the landing of the aircraft.

17. The method of claim 15, wherein:

the at least one position measurement of the separator piston includes at least two position measurements of the separator piston before a landing of the aircraft;

the at least one pressure measurement of the gas includes at least two stored pressure measurements of the gas before the landing of the aircraft;

the at least one temperature measurement of the gas includes at least two stored temperature measurements of the gas before the landing of the aircraft;

the at least one position value includes an average of the at least two position measurements of the separator piston;

the at least one pressure value includes an average of the at least two stored pressure measurements of the gas; and the at least one temperature value includes an average of the at least two stored temperature measurements of the gas.

18. The method of claim 15, further comprising determining, by the processor, a time of a landing of the aircraft based on the at least one position value, the at least one pressure value and the at least one temperature value.

19. The method of claim 15, further comprising:

determining, by the processor, an adjusted volume of gas and an adjusted volume of oil in the pitch trim actuator adjusted to a lowest operating temperature based on the volume of gas and the volume of oil; and comparing, by the processor, the adjusted volume of gas and the adjusted volume of oil in the pitch trim actuator adjusted to the lowest operating temperature to a set of predetermined thresholds.

* * * * *